Oct. 7, 1941.　　　　V. I. MONCRIEFF　　　　2,258,463
DESLUDGING DEVICE
Filed Sept. 28, 1940
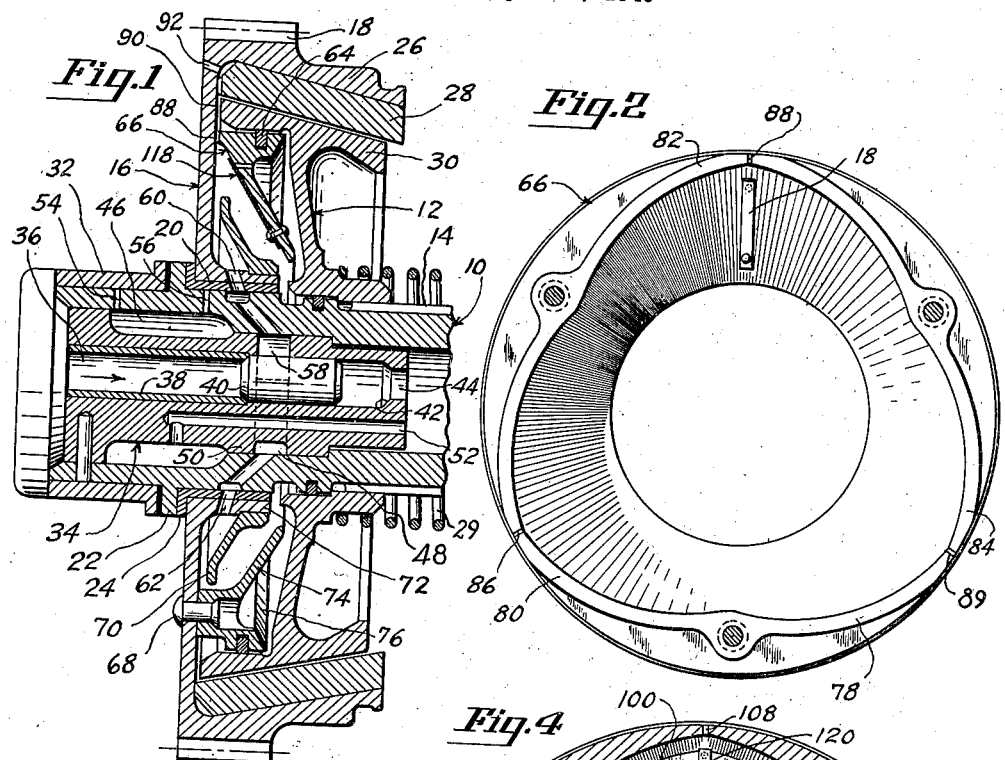
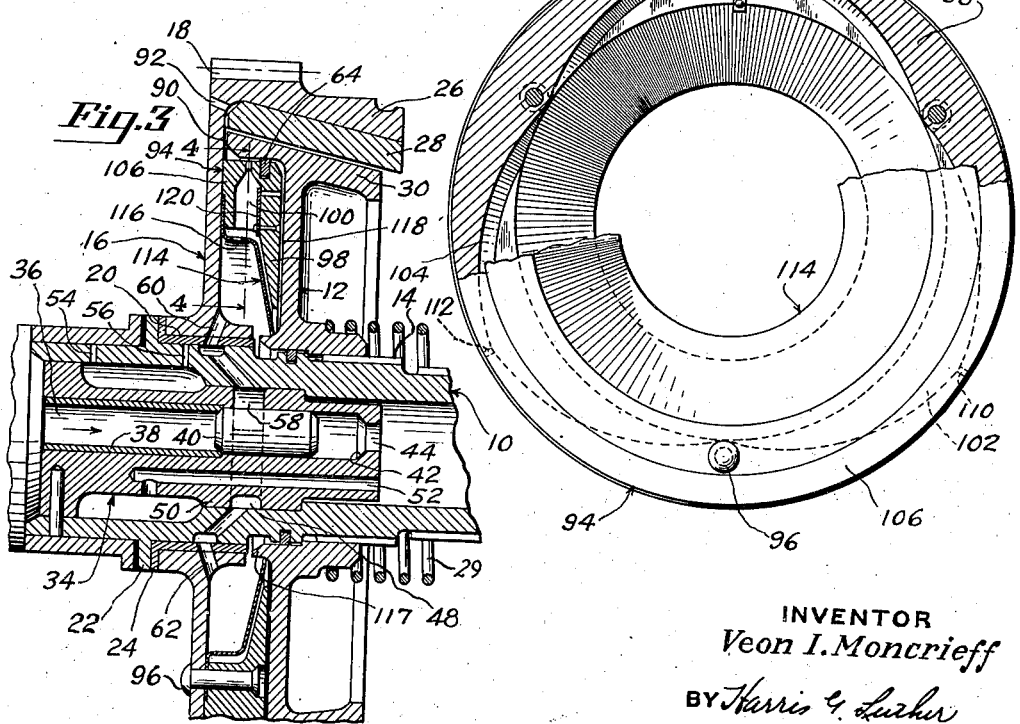
INVENTOR
Veon I. Moncrieff
BY Harris G. Luther
ATTORNEY Patented Oct. 7, 1941

2,258,463

UNITED STATES PATENT OFFICE 2,258,463

DESLUDGING DEVICE

Veon I. Moncrieff, West Hartford, Conn., assignor to United Aircraft Corporation, East Hartford, Conn., a corporation of Delaware Application September 28, 1940, Serial No. 358,863

9 Claims. (Cl. 192—113)

This invention relates to improvements in fluid operated clutches and has particular reference to improvements in hydraulically operated friction clutches particularly adapted to change the speed ratio of variable speed transmissions.

An object of the invention resides in the provision in a friction clutch of the character indicated of means for eliminating, from the interior of the clutch, fluid carried material, such as oil sludge.

A further object resides in the provision in a friction clutch of the character indicated of means which will at all times keep the interior of the clutch substantially free of solid or viscous material to insure the free operation of the clutch parts.

A still further object resides in the provision in a friction clutch of the character indicated of means for cleaning the clutch operating fluid of foreign material, such as oil sludge, before the fluid enters the clutch operating chamber.

Other objects and advantages will be more particularly pointed out hereinafter or will become apparent as the description proceeds.

In the accompanying drawing, in which like reference numerals are used to designate similar parts throughout, there is illustrated in two slightly different forms a suitable mechanical embodiment for the purpose of disclosing the invention. The drawing, however, is for the purpose of illustration only and is not to be taken as limiting or restricting the invention since it will be apparent to those skilled in the art that various changes in the illustrated constructions may be resorted to without in any way exceeding the scope of the invention.

In the drawing,

Fig. 1 is a diametrical sectional view through a clutch constructed according to the invention.

Fig. 2 is an elevational view of the piston member of the clutch shown in Fig. 1.

Fig. 3 is a diametrical sectional view similar to Fig. 1 showing a somewhat modified form of clutch construction, and Fig. 4 is a transverse sectional view of the piston member of the clutch shown in Fig. 3 taken on the line 4—4 of Fig. 3 looking in the direction of the arrows.

Referring to the drawing in detail and particularly to Figs. 1 and 2, the numeral 10 generally indicates a clutch supporting and driving shaft which is driven by some suitable source of power such as an engine or motor shaft or a gear connection. The clutch comprises an inner member, generally indicated at 12, axially slidable along the shaft 10 but restrained against rotation relative to the shaft by the spline 14, and an outer member, generally indicated at 16, provided with peripherial gear teeth 18 and rotatably mounted on the shaft 10 by suitable bearing means, such as the bushing 20, and restrained against movement axially of the shaft in at least one direction by suitable means such as the shaft collar 22 and bushing flange 24. The gear teeth 18 mesh with the teeth of a suitable driven gear, not illustrated, which transfers the power transmitted through the clutch to some driven device.

The outer member 16 is provided with a conical annular flange 26 within which is fitted an annular clutch facing 28 which may be made in one or more parts as convenience in construction and assembly may require. The inner member 12 is provided with a conical peripherial flange 30 the outer face of which engages the inner surface of the clutch facing 28 when the inner member is moved against the force of the spring 29 and away from the outer member along the shaft 10 thereby completing a driving connection from the shaft to the outer clutch member. The end of the shaft 10 projecting beyond the clutch is mounted in a suitable suporting bearing 32 and is provided with an enlarged bore to receive an oil distribution plug, generally indicated at 34. The plug 34 is provided with a substantially central bore 36 opening to the end of the shaft received in the bearing 32 so that hydraulic fluid at a relatively high pressure may be introduced into this bore at the shaft end, through suitable leads in the bearing or bearing support. Within the bore 36 there is a cylindrical bushing 38 which provides a seat for one end of a valve plunger 40 the opposite end of which cooperates with a seat 42 formed in the plug 34 near the end of the bore 36. Lubricating oil at a relatively low pressure is fed into the hollow shaft 10 at the end opposite the end received in the bearing 32 and enters the corresponding end of the bore 36 through the aperture 44 to react against the adjacent end of the plunger 40 to urge the plunger to the position illustrated in Fig. 1 in which it seats against the end of the sleeve or bushing 38 and closes the bearing end of the bore 36. The plug 34 is formed to provide a relatively elongated annular space 46 and a relatively short annular space 48 separated from the space 46 by an annular shoulder 50 on the plug which seals with the interior surface of the shaft 10. The annular space 46 is connected with the interior of the shaft 10 at the end of the plug 34 opposite the bearing 32 by means of a channel 52 and is connected with the interior of the bearing 32 by a suitable oil aperture 54 and with the interior of the bushing 20 by a suitable oil aperture, as indicated at 56, to supply lubricating oil to these bearing surfaces.

The annular channel 48 is connected with the bore 36 through a partly circumferential slot 58 and is connected with the interior of the outer clutch member 16 by suitable oil passages, as indicated at 60 and 62.

With this arrangement, when high pressure oil is introduced into the bore 36, it will first move the plunger 40 to the right, as viewed in Fig. 1, to open the slot 58 and will then flow through the passages 60 and 62 to the interior of the clutch member 16 and fill the space between the clutch members 16 and 12 exerting its pressure against the clutch member 12 to move this clutch member into engagement with the friction material 28. Leakage of oil from the space between the two clutch members may be controlled by means of a sealing ring 64 mounted in the periphery of an annular piston member telescopically associated with the inner clutch member 12 and, generally indicated at 66, secured to the outer clutch member by suitable means such as the rivets, one of which is indicated at 68.

The arrangement so far described has been found to operate entirely satisfactory as long as the hydraulic fluid used to operate the clutch is clean and free of sediment. However, when the clutch is used for certain purposes, such as to operate a change speed gear transmission, in or connected with an engine, an example of which is shown in United States application Serial No. 313,231, filed January 10, 1940, by Leonard S. Hobbs, for Two-speed supercharger drive, and is operated by engine lubricating oil containing foreign material such as sludge and metallic particles, this foreign material is deposited by centrifugal force around the outer portion of the space between the two clutch members and soon accumulates to a quantity sufficient to interfere with the operation of the clutch, tending particularly to restrain the inner clutch member 12 against movements toward the outer clutch member to release the clutch. It has, therefore, been found necessary to provide some suitable means for continuously freeing the clutch of this deposit of foreign material in those installations in which the clutch is operated by hydraulic fluid containing appreciable quantities of such foreign material.

An annular member 70, which may have a somewhat conical shape, is secured to the inner flange portion 72 of the outer clutch member 16 at the side of the apertures 60 and 62 opposite the radial wall of the outer clutch member and is slightly spaced at its periphery from the interior surface of the radial wall of the outer clutch member to provide a passage for the fluid entering the clutch member through the apertures. A radial extension 74 of the piston member 66, which radial extension may also have a somewhat conical shape, overlaps the member 70 in such a manner that the member 70 divides the annular space between the member 66 and the radial wall of the outer clutch member 16. With this arrangement the fluid entering the clutch member through the apertures 60 and 62 flows outwardly and around the periphery of the member 70 and then flows inwardly and around the edge of the contral aperture in the member 66 and thence into the space 76 between the member 66 and the radial wall of the inner clutch member 12 in which space it reacts against the inner clutch member to force this member in a direction to engage the clutch. As the fluid flows over the periphery of the member 70 it is subjected to centrifugal action which separates the heavier foreign matter from the fluid so that only cleaned fluid flows inwardly between the members 70 and 66 and into the annular space 76, the foreign matter flowing into the interior of the member 66 and to the outer limit of the interior of this member. The member 66 is preferably given a shape somewhat as shown in Fig. 2 in which the radial wall 78 which contacts the inner surface of the radial wall of the outer clutch member, instead of being circular, has a plurality of projections, such as are indicated at 80, 82 and 84 in Fig. 2, forming pockets or cavities, so that the foreign matter, such as sludge, deposited in the interior of the member 66 will be moved by centrifugal force toward the apexes of these pockets or cavities. Small apertures, as indicated in Fig. 2 at 86, 88 and 89 are provided one through the apex portion of each pocket so that a small stream of oil may continuously flow to the exterior of member 66 whenever there is oil in the interior thereof and may carry with it the matter collecting in the apex portions of these extensions. After the material has passed through the annular wall of the member 66 it may flow radially outward through a suitable space, as indicated at 90, provided between the inner portion of the inner clutch member and the clutch facing 28 and the interior surface of the outer clutch member 16 from which space it may flow through suitable apertures, one of which is indicated at 92, to the exterior of the clutch.

By this arrangement the fluid carried foreign matter, such as sludge, is continuously eliminated from the clutch with the minimum loss of hydraulic fluid and any accumulation of such foreign material which would tend to interfere with the operation of the clutch is avoided.

The arrangement illustrated in Figs. 3 and 4 is the same as that illustrated in Figs. 1 and 2 except that somewhat modified parts are used between the outer and inner clutch members to provide a piston for the outer clutch member and a coacting cylinder for the inner clutch member and eliminate sediment from the interior of the clutch. In this modified arrangement a piston member, generally indicated at 94, is secured to the radial wall of the outer clutch member by suitable means such as rivets, one of which is indicated at 96. The member 94 is in the form of an integral disc member having an annular outer portion provided with an inward extension 98 adjacent the radial wall of the inner clutch member and is preferably somewhat cone shaped on its side facing the radial wall of the outer clutch member. The outer annular portion is provided with grooves, as indicated at 100 and 104, providing cavities opening to the inner surface of the annular outer portion between the wall 98 and a wall 106 of less radial extent than the wall 98 and lying against the inner surface of the radial wall of the outer clutch member 16. Each of the grooves or pockets 100, 102 and 104 is connected at its apex with the exterior of the member 94 by a suitable restricted aperture, as indicated at 108, 110 and 112, so that material deposited in these pockets by centrifugal action may flow through these apertures and through the space 90 and apertures, such as 92.

in the outer clutch member to the exterior of the clutch. A shield member, generally indicated at 114, which may conveniently be made of sheet metal, is disposed within the member 94 and is sealed at its periphery to this member, as is clearly illustrated in Fig. 3. At its inner edge the member 114 closely surrounds an axial shoulder 117 provided on the inner clutch member 12 to prevent the hydraulic fluid from leaking past the edge of this member to the clutch operating chamber 118 without first passing to the pockets of the member 94. With this arrangement the hydraulic fluid flows from the apertures 60 and 62 into the space between the inner portion of the member 114 and the radial wall of the outer clutch member and from this space through suitable apertures in the member 114, one of which is indicated at 116, to the grooves or pockets 100, 102 and 104 of the member 94 where foreign material is separated from the hydraulic fluid and expelled through the apertures 108, 110 and 112 to the exterior of the clutch. From these pockets the hydraulic fluid flows inwardly between the member 114 and the wall 98 of the member 94 and passes over the inner edge of the member 94 to the space 118 between the member 94 and the inner clutch member 12 to move the inner clutch member into engagement with the friction material 28.

When the supply of hydraulic fluid under relatively high pressure is discontinued, the lubricating fluid at relatively low pressure, entering the bore 36 through the aperture 44 will move the plunger 40 to close off the channel 48 to prevent the loss of lubricating oil through this channel. Any hydraulic fluid remaining in the interior of the clutch member will then escape through the aperture or apertures 92 to relieve the pressure exerted between the inner and outer clutch members and permit the spring 29 to move the inner clutch member in a direction to release the clutch face 28. Oil trapped in the expansion space, between the member 66 of Fig. 1 and the inner clutch member, or between the member 94 of Fig. 3 and the inner clutch member, may be drained through suitable reed valves, as indicated at 118 in Fig. 1 and 120 in Fig. 3.

While a suitable mechanical embodiment has been illustrated in the accompanying drawing in two slightly different forms and has been hereinabove described in detail, it is to be understood that the invention is not limited to the particular arrangements so illustrated and described but that such changes in the size, shape and arrangements of the various parts may be resorted to as come within the scope of the sub-joined claims.

Having now described the invention so that others skilled in the art may clearly understand the same, what it is desired to secure by Letters Patent is as follows:

1. In a fluid operated friction clutch having an expansion chamber into which fluid under pressure is fed for forcing the driving and driven parts of said clutch into frictional engagement, an annular chamber in said clutch ahead of said expansion chamber in the direction of fluid flow through said clutch and rotatable with the clutch for subjecting the clutch operating fluid to a centrifugal cleaning action.

2. In a fluid operated friction clutch having an expansion chamber for forcing the driving and driven parts of said clutch into frictional engagement, an annular chamber in said clutch ahead of said expansion chamber in the direction of fluid flow through said clutch and rotatable therewith for subjecting the clutch operating fluid to a centrifugal cleaning action before entering said expansion chamber and a partition between said annular chamber and said expansion chamber so arranged that the clutch operating fluid is constrained to flow radially inward against centrifugal force in passing from said annular chamber to said expansion chamber.

3. In a fluid operated friction clutch having an expansion chamber for causing frictional engagement between the driving and driven parts of said clutch, an annular chamber rotatable with the clutch and located in said clutch ahead of said expansion chamber in the direction of fluid flow through said clutch for subjecting the clutch operating fluid to a centrifugal action before entering said expansion chamber, said centrifugal chamber having peripheral apertures for the discharge of sediment from said chamber.

4. In a fluid operated friction clutch having an expansion chamber for frictionally engaging the driving and driven parts of said clutch, an annular chamber rotatable with the clutch and located in said clutch ahead of said expansion chamber in the direction of fluid flow through said clutch for subjecting the clutch operating fluid to a centrifugal cleaning action before entering said expansion chamber said centrifugal chamber having radial extensions each terminating in an apex, and an aperture through each apex connected with the exterior of the clutch for the discharge of sediment from said annular chamber.

5. In a fluid operated friction clutch having a driving portion and a driven portion arranged to provide an annular fluid chamber therebetween, and friction means between said members engageable to frictionally engage said members upon expansion of said chamber, means for introducing fluid under pressure into said chamber, and a piston member in said chamber rigidly secured to one of said clutch members and having a fluid seal engagement with the other clutch member and dividing said chamber into two annular portions said piston member having pockets therein disposed between said piston member and the clutch member to which said piston member is rigidly attached, and an opening leading from the apex of each pocket to the exterior of said clutch.

6. In a fluid operated friction clutch having a driving portion and a driven portion arranged to provide an annular fluid chamber therebetween, and friction means between said members engageable to frictionally engage said members upon expansion of said chamber, means for introducing fluid under pressure into said chamber, and a piston member in said chamber rigidly secured to one of said clutch members and having a fluid seal engagement with the other clutch member and dividing said chamber into two annular portions said piston member having pockets therein disposed between said piston member and the clutch member to which said piston member is rigidly attached, and an opening leading from the apex of each pocket to the exterior of said clutch and a partition member between said piston member and the clutch member to which said piston member is rigidly attached for constraining the fluid to flow through the chambers in said piston member before entering the space between said piston member and the other of said clutch members.

7. In combination with a rotatable liquid actuated device comprising, a piston part and cylinder part, a desludging mechanism comprising a partition secured to one part of said device and located in the liquid receiving portion of said cylinder, said partition defining a chamber having radially extending pockets and means for first directing into said chamber the actuating liquid flowing to said cylinder.

8. In combination with a rotatable liquid actuated device comprising, telescoping parts defining an expansible liquid receptacle, a desludging mechanism comprising means rotatable with one part of said device and defining a chamber having radially extending pockets, and means for routing the liquid for actuating said device through said chamber.

9. In combination with a rotatable liquid actuated device comprising, telescoping parts defining an expansible liquid receptacle, a desludging mechanism comprising means rotatable with one part of said device and defining a chamber having radially extending pockets, means at the radial extremity of the pockets for continuously venting them, and means for routing the liquid for actuating said device through said chamber.

VEON I. MONCRIEFF.